Patented May 15, 1923.

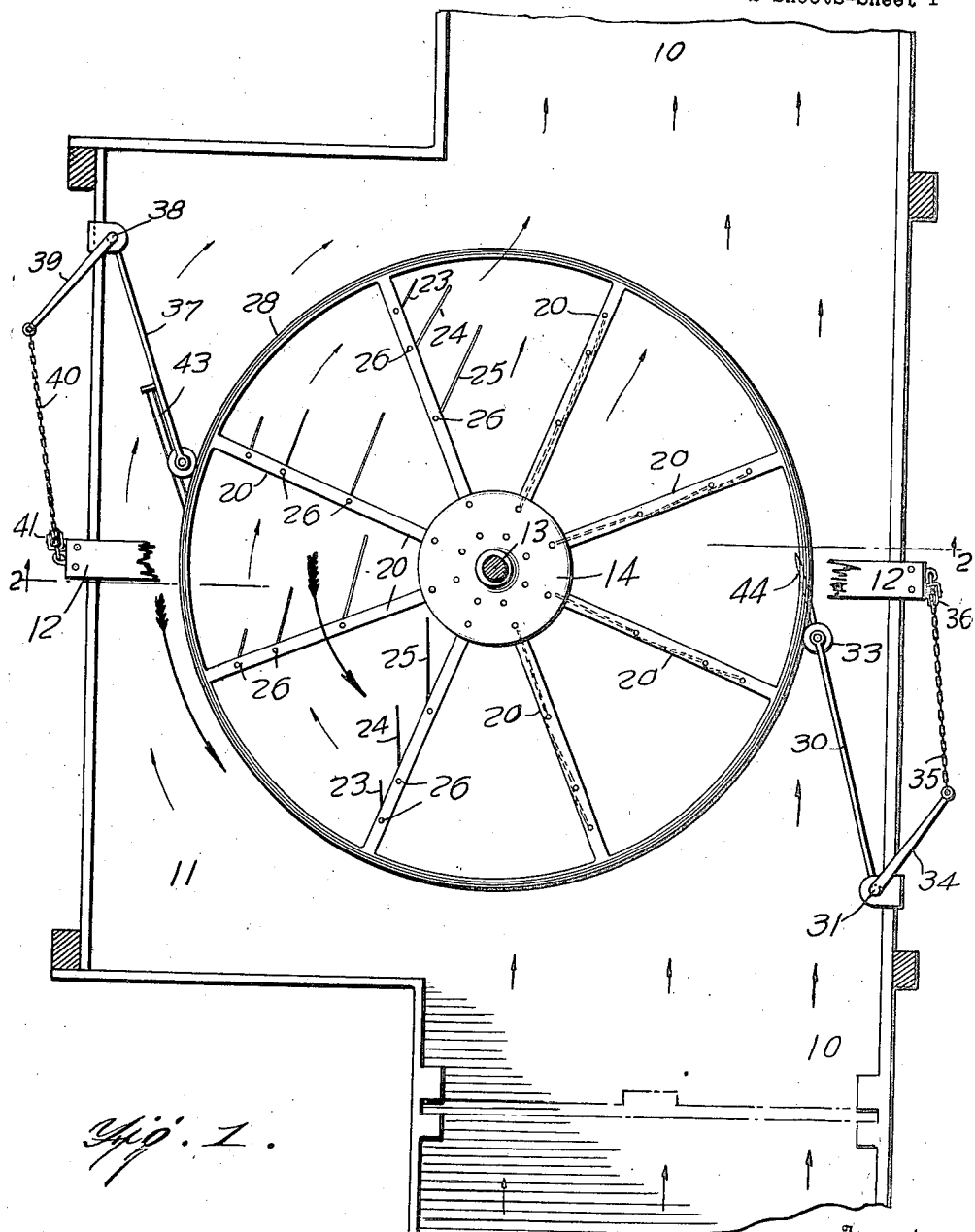

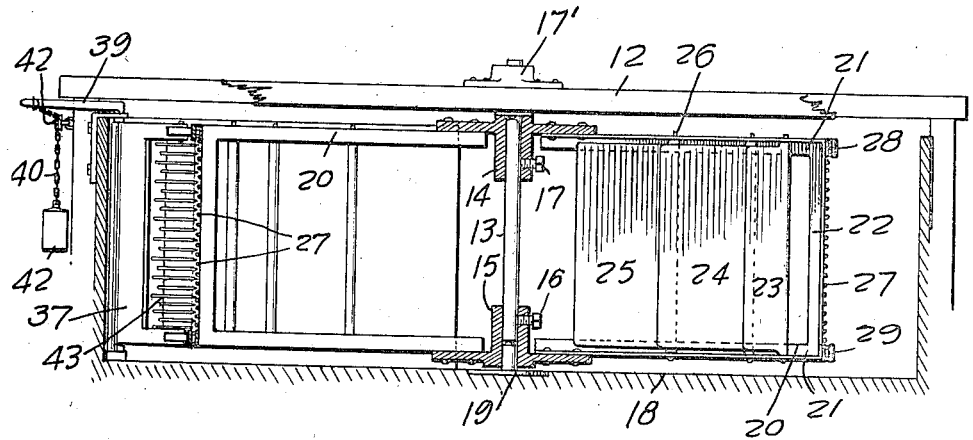
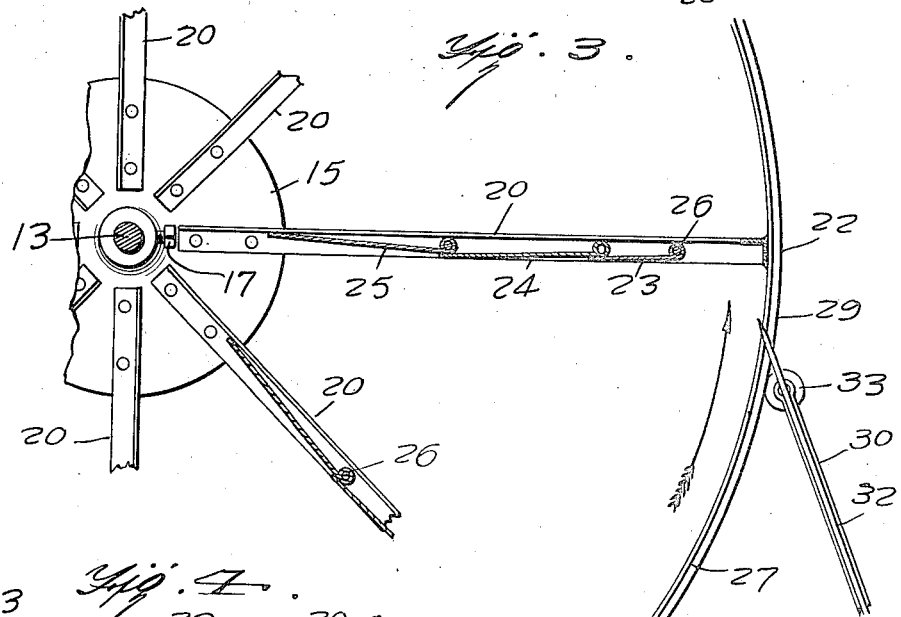
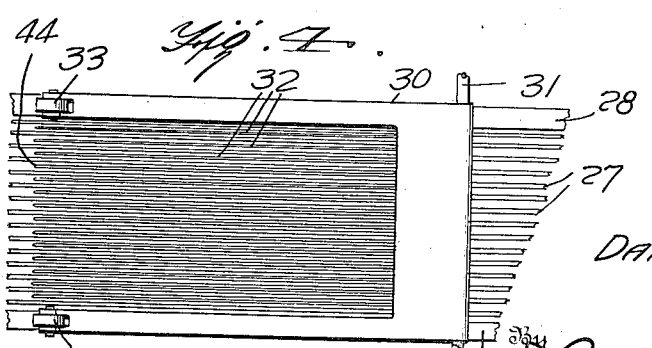

1,455,210

UNITED STATES PATENT OFFICE.

DANIEL W. KELLER, OF HARTSHORNE, OKLAHOMA.

DRIFT AND FISH RETARDER.

Application filed October 12, 1921. Serial No. 507,286.

*To all whom it may concern:*

Be it known that I, DANIEL W. KELLER, a citizen of the United States, residing at Hartshorne, in the county of Pittsburg and State of Oklahoma, have invented certain new and useful Improvements in Drift and Fish Retarders, of which the following is a specification, reference being had therein to the accompanying drawings.

This invention relates to drift and fish retarders, especially for irrigation and other canals and like water flows, and has for an object to provide a wheel of improved type with a periphery of fabric and with improved gates bearing against the periphery of the wheel to exclude extraneous matter passing about the surface of said wheel.

A further object of the invention is to provide improved types of feathering blades carried by the spokes of the wheel, whereby the flow of the water provides an automatic rotation of the wheel.

A further object of the invention is to provide an improved type of gates for operation in conjunction with the wheel.

With these and other objects in view the invention comprises certain novel units, parts, elements, combinations and arrangements, as will be hereinafter more fully described and claimed.

In the drawings:

Figure 1 is a top plan view of an installation embodying the present invention;

Figure 2 is a transverse sectional view taken on line 2—2 of Figure 1;

Figure 3 is an enlarged detail view of one of the spokes and segment of the periphery of the wheel, and Figure 4 is a view in side elevation of one of the gates.

Like characters of reference indicate corresponding parts throughout the several views.

The improved drift and fish retarder which forms the subject matter of this application is adapted to be used in conjunction with a canal or other water inlet indicated at 10 and comprises an offset chamber 11 whereby the position of the wheel is wider than the canal or water inlet compensating thereby for the obstruction of flow resulting from the interposition of the wheel and other matter in the stream.

The material of which the walls of either the canal or the offset are composed are wholly immaterial to the present invention but embodies a beam or bar 12 extending across the offset and the canal. Beneath this bar 12 the wheel is journaled upon a shaft 13 and comprises an upper hub 14 and lower hub 15 rigidly secured to said shaft in any approved manner, as by set screws 16 and 17. The shaft is journaled in the bar 12 in any usual and ordinary type of bearing, indicated at 17' and the lower end of the shaft is seated on a pivot point, the base of which sits on the bed 18 of the passage, as indicated at 19.

Rigidly secured to the hubs 14 and 15 are a plurality of radial spokes 20 extending outwardly and preferably bent at 21 to form an upright section 22. These spokes 20 and upright 22 are preferably constructed of angle iron, as indicated more particularly in the section of the upright 22 at Figure 3. Between the horizontal flanges of the spokes 20 feathering blades 23, 24 and 25 are pivoted, as by the pintles 26. The relation of the several blades is such that the blade 25 swings against the flanges of the spoke 20, while the blade 24 swings against the pintle of the blade 25 and the plate 23 against the pintle of the blade 24. With the water flowing in the direction indicated at Figure 1 the water will engage against the blades when in such closed position to rotate the wheel as an entirety in the direction indicated by the large arrows. When returning upon the opposite side it is obvious that these several blades will feather, as also indicated at Figure 1 to offer but little resistance to the rotation of the wheel.

About the periphery of the wheel at the extremities of the spokes 20 a wire fabric 27 is provided with upper and lower bands 28 and 29.

While the covering 27 has been referred to as wire fabric, it is obvious that any other form of covering having interstices for the passage of water or the like is fully within the terms of wire fabric as used herein.

At the inflow side of the canal 10 a gate 30 is mounted by being pivoted upon a vertical pintle 31. This gate is preferably made up of tines 32 interposed in an open panel, as indicated at Figure 4, and rollers 33 are provided properly spaced to roll upon the bands 28 and 29.

Integral or rigid with the pintle 31 is an arm 34 to which is connected a chain or cable 35 passing over a pulley 36 and provided with a weight which normally holds the gate yieldingly against the periphery of the wheel by holding the rollers 33 against the bands 28 and 29.

Upon the opposite side of the wheel substantially diametrically across is a second gate 37 mounted upon a pintle 38 having an arm 39 and chain 40 which passes over a pulley 41 and is provided with a weight 42, as shown more particularly at Figure 2, it being understood that the weight attached to the chain 35 is similar thereto but not shown.

To the gate 37 a brush 43 is preferably attached which brushes the mesh of the fabric 27 as the wheel rotates to dislodge therefrom any material adhering thereto.

Instead of attaching the fabric brushing element as an addition to the gate, as shown at 43, the tines or teeth 32 of the brush may be themselves extended through the fabric 27, as shown more particularly at Figure 3 so that each one of the tines or teeth 32 may occupy a position between adjacent wires of the fabric 27, the relation being shown more particularly at Figure 4.

It will be understood, of course, that the gates 30 and 37 are to prevent the passage of fish past the wheel, while permitting the passage of weeds and extraneous matter that may possibly get into engagement with the wheel and otherwise stop its rotation. Such gates will prevent to a certain extent the passage of matter but will yield when the matter is of such nature that it is not deflected.

In my prior Patent #1,276,374 a deflecting float and piling were shown for preventing floating matter from coming into contact with the wheel. It is to be understood that the present invention is adapted to be used in conjunction with similar or other floats or baffles, or any means for deflecting floating matter from the wheel, and the omission of such showing from the drawing does not indicate that the wheel may not be so used.

What I claim is:

1. The combination with an inflow conduit of an offset communicating therewith, a retarding wheel journaled partly in the conduit and partly in the offset, means inherent in the wheel for converting the flow of water into rotary motion, and gates extending outwardly from the sides of the conduit and offset and yieldingly engaging the periphery of the wheel.

2. The combination with an inflow conduit of a wheel journaled upon a vertical axis and provided with a foraminous periphery extending approximately the width of the conduit, gates pivoted to the sides of the conduit and extending outwardly and engaging the periphery of the wheel approximately at a tangent, and means to yieldingly hold the gates in such tangential relation.

3. The combination with an inflow conduit of a wheel journaled upon a vertical axis and approximately spanning said conduit laterally and extending upwardly above the normal water line, a foraminous fabric carried upon the exterior of the wheel, feathering blades carried by the wheel tending to produce rotary motion of the wheel, gates pivoted to the sides of the conduit and extending into substantially tangential relation with the exterior of the wheel, and means to hold the gates yieldingly in such tangential relation.

4. The combination with an inflow conduit of a wheel journaled in and substantially spanning the conduit laterally and provided with a foraminous periphery extending normally above the water line, a gate pivoted to the side of the conduit and extending into approximately tangential relation with the wheel, said gate comprising a plurality of tines interposed in an open panel, and means to hold the gate and extremities of the tines in tangential relation.

5. The combination with an inflow conduit of a wheel interposed in and substantially spanning the conduit laterally, a foraminous fabric carried by the periphery and extending above the normal water line, a gate pivoted to the side of the conduit and extending onto approximately tangential relation with the wheel, a brush carried by the gate and bearing upon the foraminous fabric, and means to hold the brush in yielding contact with such fabric.

In testimony whereof I hereunto affix my signature in presence of two witnesses.

DANIEL W. KELLER.

Witnesses:
J. H. BAKER,
C. L. SACKELL.